US008576465B2

(12) United States Patent
Nelson et al.

(10) Patent No.: US 8,576,465 B2
(45) Date of Patent: Nov. 5, 2013

(54) PRINTER CALIBRATION

(75) Inventors: Terry M. Nelson, Boise, ID (US); Mark Shaw, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1306 days.

(21) Appl. No.: 11/895,781

(22) Filed: Aug. 27, 2007

(65) Prior Publication Data

US 2009/0059311 A1 Mar. 5, 2009

(51) Int. Cl.
*H04N 1/46* (2006.01)

(52) U.S. Cl.
USPC ............ 358/504; 358/1.9; 358/406; 382/162; 382/167

(58) Field of Classification Search
None
See application file for complete search history.

(56) References Cited

U.S. PATENT DOCUMENTS

| 5,806,430 | A | 9/1998 | Rodi |
| 6,031,628 | A | 2/2000 | Jacob et al. |
| 6,067,406 | A * | 5/2000 | Van Hoof et al. ............. 358/1.9 |
| 6,108,100 | A * | 8/2000 | McVey et al. ................ 358/1.16 |
| 6,580,524 | B1 | 6/2003 | Weichmann et al. |
| 6,636,326 | B1 | 10/2003 | Zuber |
| 7,061,648 | B2 | 6/2006 | Nakajima et al. |
| 7,092,119 | B1 * | 8/2006 | Hinds et al. ................... 358/1.9 |
| 7,536,281 | B2 * | 5/2009 | Ternent et al. ................ 702/190 |
| 2002/0116439 | A1 | 8/2002 | Someshwar et al. |
| 2004/0190019 | A1 | 9/2004 | Li et al. |
| 2005/0237548 | A1 * | 10/2005 | Suzuki .......................... 358/1.9 |
| 2005/0259276 | A1 | 11/2005 | Smith, II et al. |
| 2005/0275852 | A1 | 12/2005 | Ferlitsch |
| 2005/0275854 | A1 | 12/2005 | Bailey |
| 2007/0055707 | A1 * | 3/2007 | Dandekar et al. ............. 707/200 |
| 2011/0205581 | A1 * | 8/2011 | Machii et al. ................ 358/1.15 |

* cited by examiner

*Primary Examiner* — Miya J Cato

(57) ABSTRACT

A method of calibrating a printing device includes storing current calibration data in the printing device; and modifying each incoming print job using the calibration data stored in the printing device. A printing device having a calibration function includes a memory storing current calibration data in the printing device; and an operator, executed by the printing device, configured to modify each incoming print job using the calibration data stored in the printing device.

17 Claims, 4 Drawing Sheets

PRINTER CALIBRATION

BACKGROUND

Digital printing devices are used to produce hardcopy documents bearing any desired images based on electronic data. Examples of digital printing devices including, but are not limited to, printers, including laser and inkjet printers; plotters; commercial digital printing presses; fax machines; photocopy and digital copy machines; multifunction peripherals and similar devices The images produced by such digital printing devices may be color images or may be black and white. Where color images are produced, the color images are typically created using a limited number of primary colors, for example, cyan (C), magenta (M), yellow (Y) and black (K). Using a technique referred to as "half-toning," dots of these primary colors are blended on the printed document to produce a full-color image with hues across the entire visible spectrum.

The half-toning function of each particular printing device needs to be calibrated. This calibration ensures that the colors output by the printing device through half-toning actually match the colors desired for that document or the colors of an original document being copied. Other functions of a printing device may also need or benefit from calibration. The quality of the images produced will accordingly be highly dependent on the accuracy of the calibration of that printing device.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
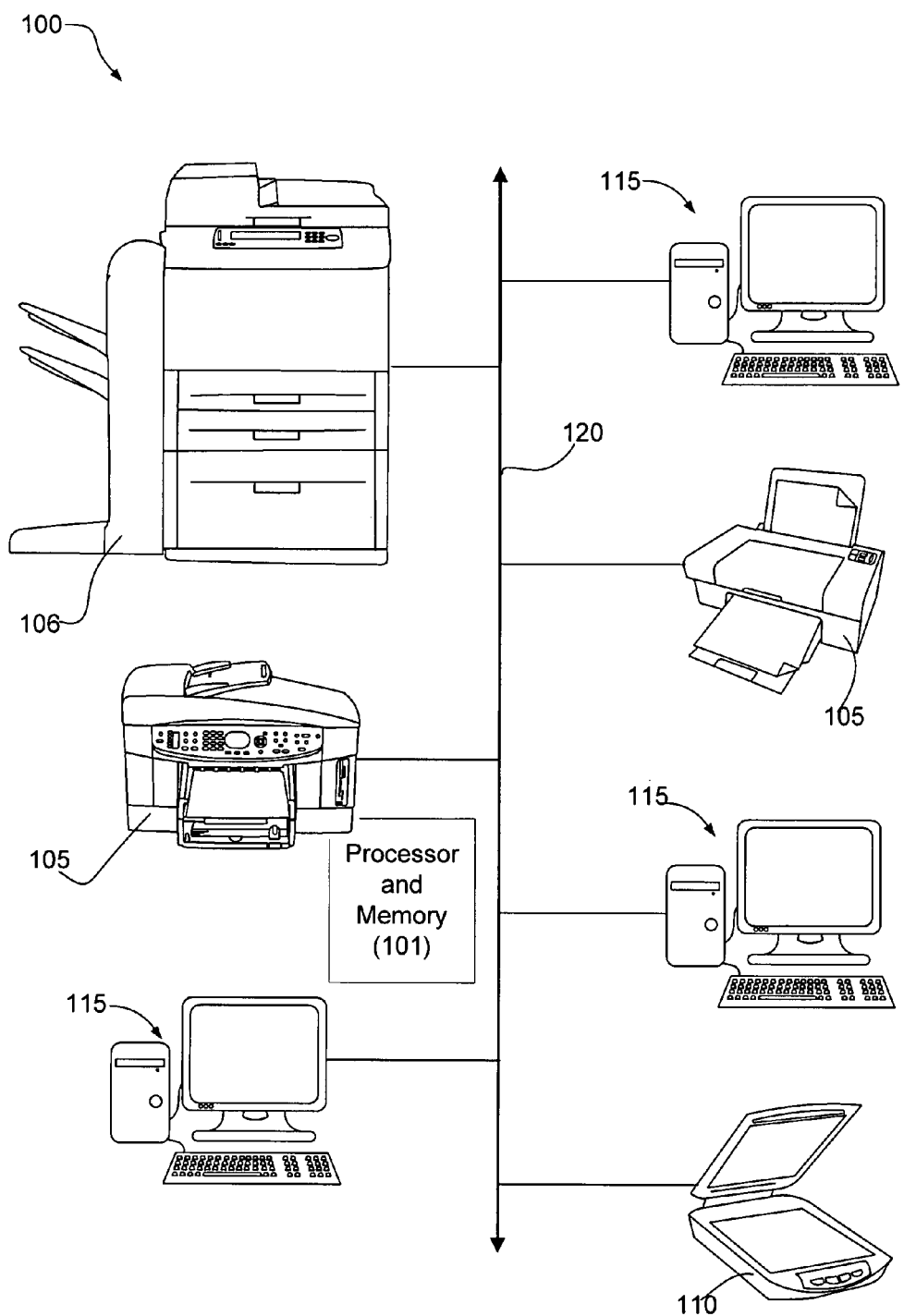
FIG. 1 is a diagram of an exemplary embodiment of a network that includes a calibrated printing device according to principles described herein.

External half-tone calibration data has typically been embedded in each print job being sent to a particular printing device. In contrast, the present specification describes methods and systems in which externally produced half-tone calibration data is downloaded to a printing device and remains resident on that printing device so that each print job sent to the printing device can make use of and benefit from the latest calibration data, even if that calibration data was not available to the client submitting that print job or otherwise not embedded into the print job itself. In some embodiments, the calibration data can be cleared from the printing device by rebooting the printing device or sending an unload program to the printing device.

In an external calibration process, a test page or pages are printed by the printing device and then analyzed and compared to electronic data defining the colors and possibly other aspects of the document being produced or reproduced. This analysis may be conducted by the printing device itself, but is more typically conducted using other devices external to the printing device, hence the term "external" calibration process. In this way, data defining needed adjustments to the printing process can be generated such that the output of the printing device more closely matches the original document being copied or the document as designed electronically by a user.

Such calibration methods typically occur during or directly following the manufacturing process for a printing device. However, this original calibration data may become less accurate over time during the operating life of the printing device. Consequently, recalibration may be conducted periodically during the life of the printing device.

Adjustments in the calibration data may be needed in response to a variety of factors, including but not limited to, the aging of various printing device components, temperature and humidity changes, and changes between batches of inks used to print an image. In color laser printers, the problem of low density dropout may cause color inconsistency and other print abnormalities. Also, the manner in which a media sheet is advanced during printing may be another parameter that can affect the quality of the outputted image. For these reasons, it is known to periodically re-calibrate a digital printing device.

As indicated above, for traditional external printer calibration, a test page or pages are printed, analyzed or measured, and a new half-tone set is built that corrects for a printer's current print condition. This correctional data must then be embedded in each print job for this data to correct the printer's tone curves when printing that print job. This embedding process is normally done in the printer's driver, or in some post processing stage of the print job on a host computer before the print job is transmitted to the printing device.

However, in a network environment, many print jobs may be transmitted to the printing device from a peripheral or network client that does not have the latest calibration data for that printing device. As a result, any such print job, lacking the latest calibration data for the printing device, will suffer a reduced image quality.

In many modern printing devices, the PostScript language is used for print jobs. The PostScript graphics language is a simple interpretive programming language with powerful graphics capabilities. Its primary application is to describe the appearance of text, graphical shapes, and sampled images on printed or displayed pages that are being converted into a print job. A program in this language can communicate a description of a document from a composition system to a printing system or control the appearance of text and graphics on a display. The description is high level and device independent.

"PostScript" is a trademark of Adobe Systems, Incorporated. However, the term "PostScript" is also a commonly used and well defined term in the art that describes this standard language for image display and printing applications. As used herein and in the independent claims, the term "PostScript" is used, not in its trademark sense, but in its technical sense as referring to a specific standard language well-known in the art for image display and printing applications.

Adobe Systems has authored a book entitled "PostScript Language Reference Manual: Second Edition," published by Addison Wesley, 1990, which sets forth the current PostScript language standard. This book is hereby incorporated by reference. Although, standards such as the Postscript language standard tend to evolve new features and the present specification and definition of the term "PostScript" are intended to encompass any such future evolution of the standard language, its derivatives or replacements.

As indicated above, within computer networks, print jobs are often sent directly to the printing device from peripherals, servers or other networked devices other than a traditional personal computer (PC) running a printer driver for that printing device and having the latest calibration data to embed in a new print job. Consequently, it has been discovered that the latest calibration data for a particular printing device, including, for example, half-tones sets, color tables and other calibration data, can be stored on the printing device itself. This allows all print jobs that are printed by that printing device to be produced using the most up-to-date calibration data. This technique renders the correctional calibration of print jobs independent of printer drivers or computer operating systems ("OS").

More specifically, the present specification discloses a system and method of downloading a semi-permanent calibrated half-tone set, as well as other potential calibration data such as a color table, to a PostScript-compatible printing device that will stay resident in the printing device until, for example, the printing device is power cycled or until a special unload program is sent to the printing device. The method allows for much simpler implementation and benefit for external printer calibration since each print job data stream does not need to be modified with calibration data before being transmitted to the printing device.

As used in the present specification and in the appended claims, the term "PostScript-compatible" means that the printing system complies with PostScript specifications and standards as understood in the art or published by a standards body. A PostScript-compatible printing device accepts valid PostScript programs and commands, and yields graphical output as specified by PostScript standards.

As used in the present specification and in the appended claims, the term "calibration data" refers to data which is derived from the measurement of one or more test sheets and ultimately used to alter or adjust the behavior of a printing device. Consequently, "calibration data" may include, but is not limited to half-tone sets, color tables and other calibration data.

Also, as used herein and in the appended claims, the terms "printing device," "printer" and "printing system" will be used broadly to refer to any type of device that produces a hardcopy document using electronic data including, but not limited to, a printer, facsimile machine, scanner, plotter, copier, multi-function peripheral, etc.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary systems and methods of network printing.

Exemplary Systems

FIG. 1 is a diagram showing an exemplary computer network including a set of networked devices including printer clients (115), printers or printing devices (105), a copier or multi-function peripheral (106) and a scanner (110) interconnected over a network (120). As will be appreciated by those skilled in the art, a computer network may have any number of various components including, but not limited to, servers, disc arrays, laptops, desktops, routers, etc. The principles disclosed herein may be implemented in any computer network. The network configuration of FIG. 1 is provided merely for purposes of example and discussion, and is not intended to limit the type or configuration of network to which the principles disclosed herein apply.

In FIG. 1, the printing devices are each generally indicated as (105). However, the copier or multi-function peripheral (106) may also be considered a printing device as defined above.

As is well known in any office context, there are also on the network any number of printer clients or computers (115), each computer being either a source of image data for the printers or copiers and/or having administrative functions over one or more machines. One or more computers can act as a server for implementing the network (120) through which all of the machines communicate. One or more computers may also act as print servers that may be configured to route and manage print jobs being executed by the printing devices (105).

Of course, the networked machines, such as shown in FIG. 1, need not be located in one small area. Rather, the exemplary networked devices can be distributed anywhere in the world and can include machines which are associated with end users, system administrators, and service providers.

The computer network (120) may use or include any one of many different network protocols available to enable communication between the workstations (115) and any other network components. Examples of network protocols that may be used with computer networks (120) of this specification include, but are not limited to, Ethernet, asynchronous transfer mode, fiber distributed data interface, token-based protocols, LocalTalk, and combinations thereof.

The scanner (110) is shown as a standard bed scanner (110) for documents. However, the scanner (110) can be any type of scanner including a bed or drum scanner, a spectrophotometer, etc. Additionally, it is common that a scanner (110) may be associated with a copier (106) and or have an automatic document handler for the feeding of a series of sheets for recording by the scanner. As described herein, the scanner (110) may play a role in generating external calibration data for a printing device (105).

The printing devices (105) may each include a microprocessor and associated memory (101). The memory may contain processor instructions that are executable by the microprocessor to perform desired steps and operations to produce hardcopy documents from electronic data. In the illustrated example, such programmed steps and operations implement a PostScript-compatible interpreter. Standard programming techniques are used to compile instructions and programs that are sequentially executed by the microprocessor to carry out the functions of the interpreter.

The printing devices (105) may also include communications means for receiving PostScript commands and programs from an external source via the network (120) as indicated by FIG. 1. These communications means may include a conventional parallel, serial, or network communications port. In many cases, bi-directional communications may be provided.

As described above, any printing device (105), including copiers (106), will occasionally or periodically need calibration. Calibration may require the printing device (105) to output one or more test sheets. The image data for rendering the test sheets can originate within each printing device (105) or come from a printer client or server, such as a computer (115), on the network (120). Calibration may further requires that the output test sheets be scrutinized by a color measuring device, e.g., an input scanner, such as free-standing scanner (110) or a scanner associated with a copier (106). A scanner (110) that is ordinarily adapted for scanning of documents may be used for this purpose.

Exemplary Method

Figure 2:
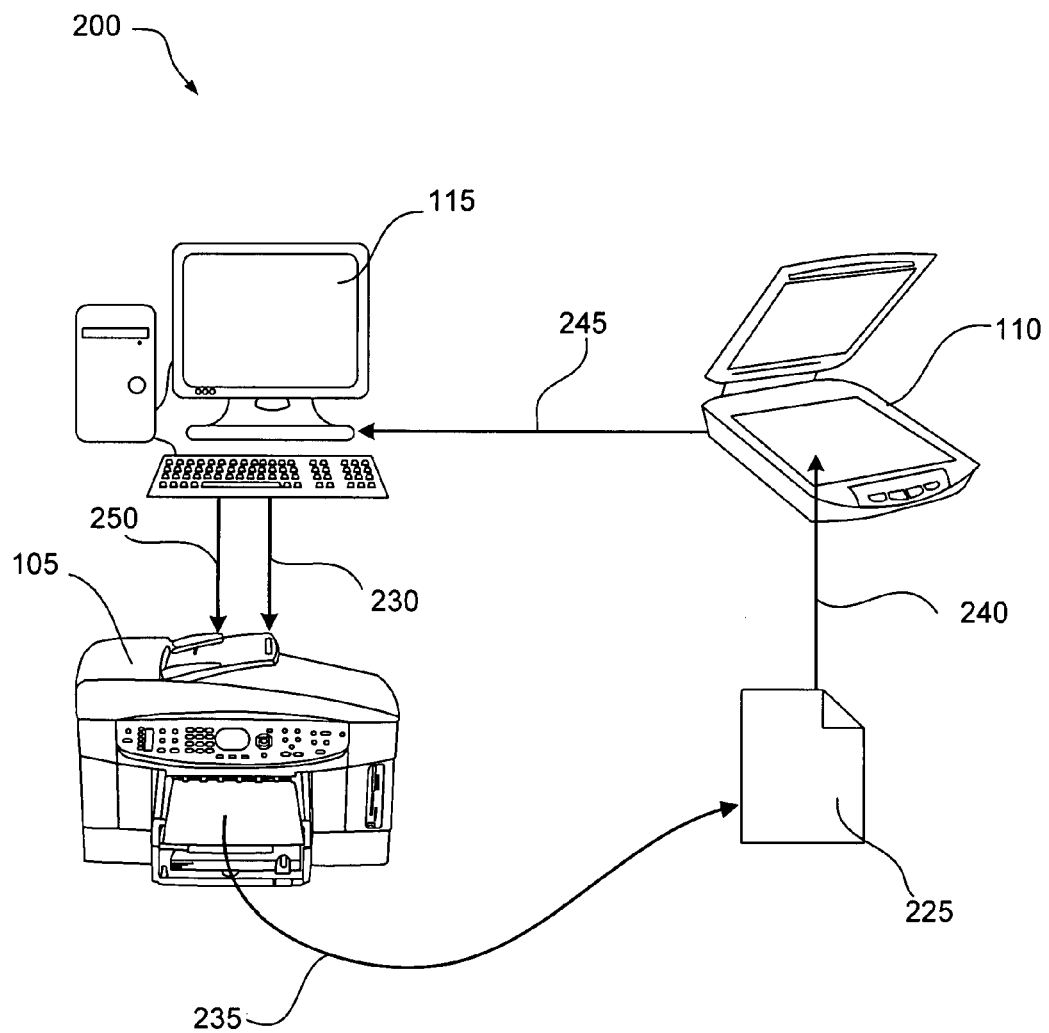
FIG. 2 is a schematic diagram illustrating an exemplary embodiment of a method for performing external calibration of a printing device according to principles described herein.

Referring now to FIG. 2, the flow of information in an exemplary method (200) of providing calibration information is illustrated. The exemplary method (200) illustrates a way to provide calibration information to a printing device such that all subsequent print jobs may be printed more accurately without requiring the print data stream for each incoming print job to have been modified according to the calibration data. The process begins when a computer (115), such as a printer client or print server, sends image data (230) for rendering one or more test sheets to the printing device (105) or test sheets are produced from data internal to the printing device (105).

As discussed above the image data may be in the form of a PostScript procedure or commands. This PostScript information may be transmitted (230) to the printing device (105) by any of the communication means discussed above. Alternatively, the image information for rendering the test sheets may be provided by the printing device itself (105). The printing device (105) then interprets the image data and prints (235) one or more test sheets (225). These sheets (225) should be configured to allow a computer (115) or a user to determine the adjustments needed to correct variations in the print job data as rendered and printed by the printing device (105). The test page or pages (225) may then be scanned (240) by a scanner (110). This scanner (110) may be a stand-alone scanner (110) or may be incorporated into an all-in-one machine, multi-function peripheral or copy machine (FIG. 1, 106).

Once the test page or pages (225) have been scanned (240), the information obtained may be sent (245) back to the computer (115) initiating the test. Alternatively, it may be sent to any other device, including the printing device (105) itself, configured to determine the changes necessary to correct the printing device's output and produce new half-tone or color table information. These new half-tones may then be added to a Postscript procedure (250) and sent to the printing device (105) where the procedure will be installed behind the server loop. These steps will be discussed in more detail below.

Figure 3:
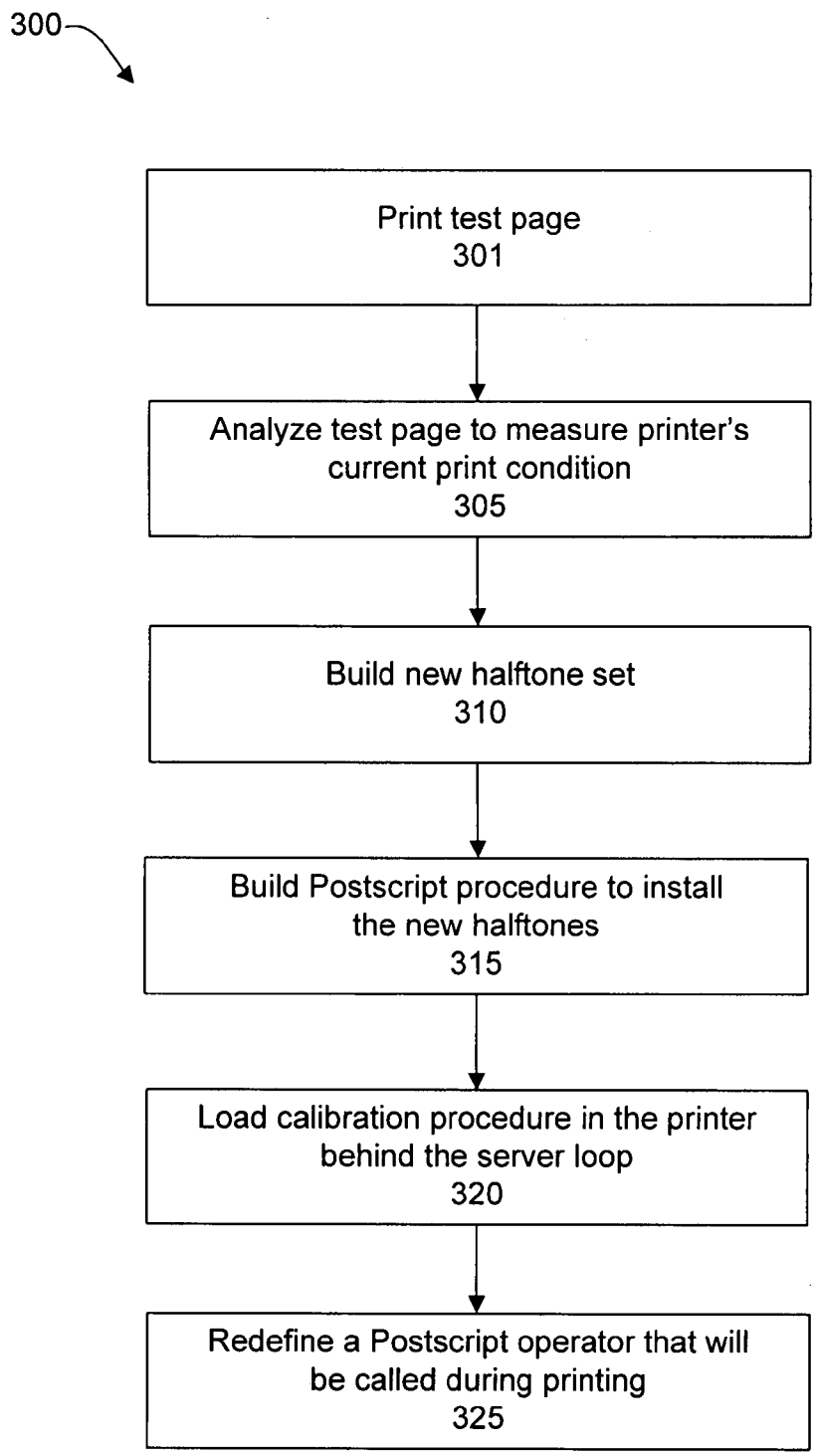
FIG. 3 is a flowchart illustrating an exemplary embodiment of a method of calibrating a printing device according to principles described herein.

Referring now to FIG. 3, an exemplary embodiment of a method of providing calibration information is illustrated. The exemplary method (300) illustrates one possible way to provide calibration information to a printing device such that all subsequent print jobs may be printed more accurately without requiring the print job data stream to be modified by calibration data before it is sent to the printing device.

The process begins by printing (step 301) one or more test pages with the printing device to be calibrated. As indicated above, these pages may originate from the printing device or from a computer that is connected to the printing device. The test pages should be configured to allow a user or a machine to identify any irregularities or problems with the printing device's output data.

These pages are then analyzed (step 305) to measure the current condition of the printing device. Based on the printing device's current condition a half-tone set is built (step 310) that may correct for any irregularities in the color output of the printing device. As discussed above, such irregularities may be caused by a variety of factors, including but not limited to, the aging of various components, temperature and humidity changes, and changes between batches of inks used to create the image. Also, low density dropout and the manner in which a media sheet is advanced may cause variations in the printing device output.

A Postscript procedure is then built (step 315) that, when called by the printing device, will install or embed the new half-tones in each subsequent print job being processed by the printing device. This calibration procedure is then loaded (step 320) on the printing device behind the server loop.

The server loop in Postscript is the internal job control loop for the printing device. The server loop insures that each print job starts with the same environment. The server loop does this via a normal programming technique that includes placing a 'mark' object on the program and data stacks. At the end of a job, a recover process deletes all data/code above the 'mark,' returning the loop to its original state. The Postscript code "serverdict begin 0 exitserver" causes this recovery process to occur immediately instead of at the end of a print job. Extra care must be taken on any server loop code since bugs in this code can propagate to each print job.

Using the 'exitserver' command is a standard way of downloading something to a Postscript device in such a way the download will stay resident on the device. This command has historically been used for downloading extra fonts and forms to printing devices.

Under the principles of the present specification, the Postscript calibration procedure may be sent to the printing device embedded in a Postscript print job, or it may be sent to the printing device as a stand-alone program. In either case, the printing device will interpret the procedure and install the new half-tones in the printing device memory for use with each subsequent print job.

The Postscript procedure causes a Postscript operator, method, or procedure that is guaranteed to be called for every print job to be redefined (step 325) so that first it executes the downloaded calibration procedure, and then continues on with normal operation. This process is also done behind the server loop so as to stay resident in the printing device. This type of re-definition is also common and well documented in the Postscript literature. This process will stay resident in the printing device and provide the new half-tone calibration for each print job. The new process can be removed by sending an un-install print job (which runs behind the server loop), or by re-booting the printer.

A sample of the key Postscript code process follows.

```
%!ps
    % This is a normal first line of a Postscript program
    % These are comments in Postscript
serverdict begin 0 exitserver
    % This is one of the two standard methods of exiting the
    Postscript server loop to load things in a stay resident form
/example {procedure} def
    % This is how Postscript procedures are defined. "example" is
    the name, everything between { } is executable code, and "def"
    means define.
/addMyHalf-tones { A Postscript procedure to load the half-tones goes
here } def
    %addMyHalf-tones is now the name of the procedure to add the
        new half-tones
/showpage { addMyHalf-tones systemdict /showpage load exec} def
    % This makes a new
    "showpage" procedure that first calls addMyHalf-tones, then calls
    the original system showpage procedure. This will be executed
    everytime "showpage" is called from now on, which will cause
    the addMyHalf-tones to execute for each page of every job.
```

The above is a very simple example to help illustrate and explain the concept. An actual implementation might also include status, verification, enable, disable, copyright, and unload code blocks which also run behind the server loop.

Because the Postscript procedure that adds the calibration data to the print jobs is called every time a print job is printed, even print jobs that are sent over a network directly to the printing device will have the advantage of being printed using the latest calibration data.

It will be appreciated by those skilled in the art that principles disclosed herein provide significant advantages over prior methods of managing external calibration data for printing devices. For example, previously, modified printer drivers on each printer client have been used to add the calibration data to each print job. Thus, each computer on the network needed to have the updated calibration data added to its driver. Additionally, the driver programming had to be customized for each Operating System ("OS").

In some systems, in order to avoid having to update calibration data on every computer, one or more computer servers have been used that manage the external calibration data. However, as noted above, in many network environments, printer clients send print jobs directly to the printing devices, thus bypassing any such server and not receiving any of the benefits of the latest calibration data. T Another prior solution to managing external calibration data involved adding the calibration data to the job streams using post process routines. However, these routines are also OS dependent and thus required OS dependent code.

In contrast, the principles described herein address all these scenarios as well by allowing print jobs sent directly to the printing device to be printed using the latest calibration data, without requiring any OS specific or specialized driver programming.

Figure 4:
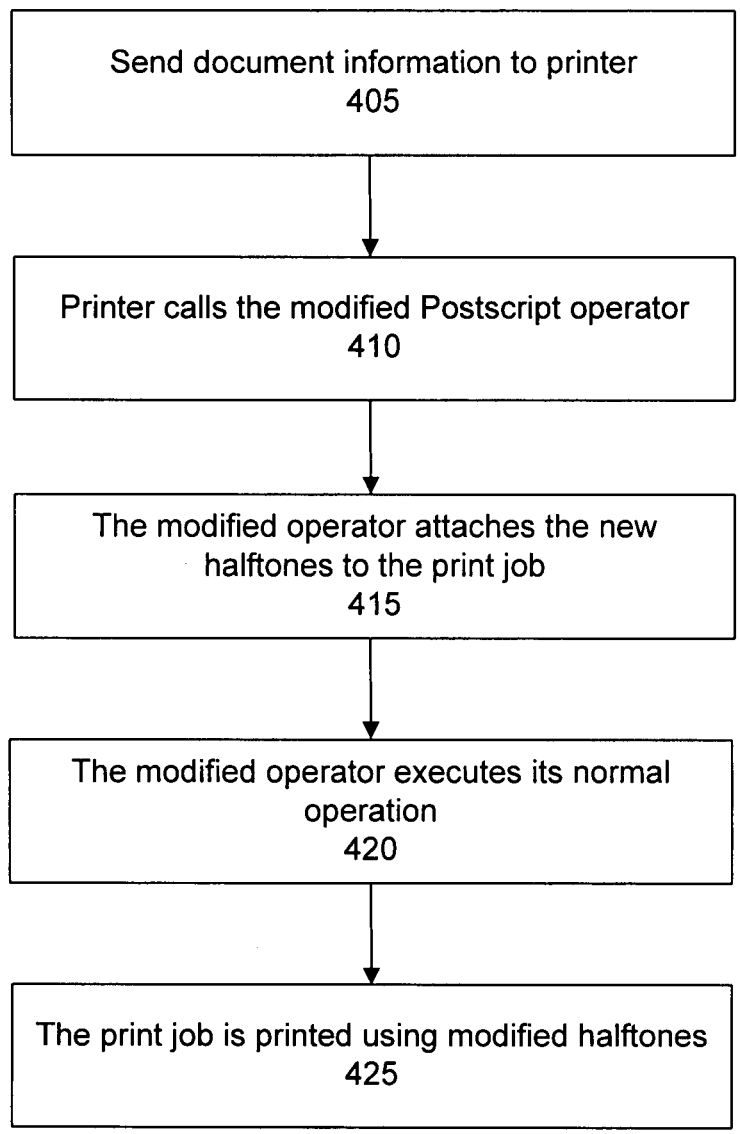
FIG. 4 is a flowchart illustrating an exemplary embodiment of a method of printing a document according to principles described herein.

Referring now to FIG. 4, an exemplary method (400) for printing an image is illustrated. The exemplary method provides a way to print an image or document using an updated half-tone set without having to modify the print job using the updated half-tone set at the printer client.

The document may include text, images, labels, barcodes or any combination thereof. The process begins when the document information is sent (step 405) to the printing device. The document may be sent (step 405) directly to the printing device over a hardware cable, wirelessly, or through a print server.

During the printing process, a modified Postscript operator is called (step 410). This operator first retrieves the latest half-tone or other calibration data resident in the printing device and then attaches (step 415) the latest half-tone set and/or other calibration data to the print job.

The operator then executes (step 420) its normal operation. As a result of which, the print job is printed (step 425) using the updated half-tone and/or other calibration information. As a result, the quality of the print job is optimized by the latest calibration data, without having that calibration data available to the printer client or used to modify the print job by the printer client.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of calibrating a printing device, said method comprising:

storing current calibration data in said printing device; and
modifying each incoming print job using said calibration data stored in said printing device; and
removing said current calibration data from said printing device by rebooting said printing device.

2. The method of claim 1, wherein said calibration data comprises half-tone correction data.

3. The method of claim 2, wherein a calibration procedure is configured to attach said half-tone correction data to a subsequent print job.

4. The method of claim 1, wherein said calibration data comprises color table correction data.

5. The method of claim 1, further comprising:
determining said printing device's current print condition;
producing said calibration data from said determination of said current print condition;
building a PostScript calibration procedure implementing said calibration data; and
modifying a PostScript operator located on said printing device to execute said PostScript calibration procedure for each incoming print job.

6. The method of claim 5, wherein said determining said printing device's current condition further comprises printing a test page with said printing device and analyzing said test page.

7. The method of claim 5, wherein said operator is located behind the server loop of the printing device.

8. The method of claim 5, wherein said operator is called for every print job received at the printing device.

9. The method of claim 5, in which receiving said calibration procedure with said printing device comprises, receiving said calibration procedure attached to a print job.

10. The method of claim 1, in which modifying each incoming print job using said calibration data stored in said printing device is completed independent of any printer drivers or computer operating systems ("OS") associated with the printing device.

11. A printing device comprising a calibration function, said device comprising:
a memory storing current calibration data in said printing device; and
an operator, executed by said printing device, configured to modify each incoming print job using said calibration data stored in said printing device;
in which said operator is located behind the server loop of the printing device; and
in which rebooting the printing device permanently removes the operator from the printing device.

12. The device of claim 11, wherein said calibration data comprises half-tone correction data.

13. The device of claim 12, wherein said operator is configured to attach said half-tone correction data to a subsequent print job.

14. The device of claim 11, wherein said calibration data comprises color table correction data.

15. The device of claim 11, wherein said operator is a PostScript operator that implements a calibration procedure using said calibration data for each incoming print job.

16. The device of claim 11, wherein said operator is called for every print job received at the printing device.

17. The printing device of claim 11, in which modifying each incoming print job using said calibration data stored in said printing device is completed independent of any printer drivers or computer operating systems ("OS") associated with the printing device.

* * * * *

UNITED STATES PATENT AND TRADEMARK OFFICE
CERTIFICATE OF CORRECTION

| | | |
|---|---|---|
| PATENT NO. | : 8,576,465 B2 | Page 1 of 1 |
| APPLICATION NO. | : 11/895781 | |
| DATED | : November 5, 2013 | |
| INVENTOR(S) | : Terry M. Nelson et al. | |

It is certified that error appears in the above-identified patent and that said Letters Patent is hereby corrected as shown below:

In the Claims

In column 8, line 30, in Claim 9, delete "which" and insert -- which, --, therefor.

Signed and Sealed this
Fourth Day of February, 2014

Michelle K. Lee
*Deputy Director of the United States Patent and Trademark Office*